United States Patent
Rapps et al.

(10) Patent No.: US 7,415,623 B2
(45) Date of Patent: Aug. 19, 2008

(54) SYSTEM FOR MANAGING THE POWER SOURCE LIFE BETWEEN MULTIPLE INDIVIDUALLY POWERED DEVICES IN A WIRED SYSTEM AND METHOD OF USING SAME

(75) Inventors: Jason A. Rapps, Tamarac, FL (US); Richard D. Grundy, Plantation, FL (US); Patrick D. Koskan, Lake Worth, FL (US); James S. Mitrosky, Margate, FL (US)

(73) Assignee: Motorola, Inc., Schaumburg, IL (US)

( * ) Notice: Subject to any disclaimer, the term of this patent is extended or adjusted under 35 U.S.C. 154(b) by 204 days.

(21) Appl. No.: 11/461,295

(22) Filed: Jul. 31, 2006

(65) Prior Publication Data
US 2008/0028239 A1   Jan. 31, 2008

(51) Int. Cl.
G06F 1/00 (2006.01)
G06F 1/26 (2006.01)
G06F 1/32 (2006.01)
G06F 11/30 (2006.01)

(52) U.S. Cl. ............... 713/300; 713/320; 713/340; 709/201

(58) Field of Classification Search ............ 713/300, 713/320, 340; 709/201
See application file for complete search history.

(56) References Cited

U.S. PATENT DOCUMENTS

| | | | | |
|---|---|---|---|---|
| 7,069,463 | B2 * | 6/2006 | Oh | 713/503 |
| 7,321,976 | B2 * | 1/2008 | Hasegawa | 713/330 |
| 7,325,149 | B2 * | 1/2008 | Liu et al. | 713/300 |
| 7,337,334 | B2 * | 2/2008 | Kuhlmann et al. | 713/300 |
| 7,363,519 | B2 * | 4/2008 | Liebenow | 713/300 |
| 2006/0129850 | A1 * | 6/2006 | Hassan et al. | 713/300 |
| 2008/0089313 | A1 * | 4/2008 | Cayo et al. | 370/345 |

OTHER PUBLICATIONS

Cheng et al., Hybrid Cluster Computing with Mobile Objects, 2000, High Performance Computing in the Asia-Pacific Region, 2000. Proceedings. The Fourth International Conference/Exhibition. vol. 2, pp. 909-914. □□.*

* cited by examiner

Primary Examiner—Mark Connolly

(57) ABSTRACT

A power management system (100) includes a group of individually powered electronic devices (101-107) connected with a power management controller (109). The power management controller (109) operates to determine the operation and charge of each power source of the electronic devices (101-107) for managing the power source life of at least one of the devices through the use of pre-selected power management algorithms. These include a preprogrammed and predictive algorithm (203, 205) based on anticipated or actual device activity, a priority algorithm (207) based on device priority or a maximize work shift algorithm (209) based on the time period of the user's work shift.

20 Claims, 5 Drawing Sheets

SYSTEM FOR MANAGING THE POWER SOURCE LIFE BETWEEN MULTIPLE INDIVIDUALLY POWERED DEVICES IN A WIRED SYSTEM AND METHOD OF USING SAME

FIELD OF THE INVENTION

The present invention relates generally to power management in portable devices and more particularly to managing individual power sources of the portable devices in a wired system.

BACKGROUND

Battery life is a critical component in today's world of portable electronics, particularly in wireless communications. It is not uncommon for business persons to carry and use multiple devices such as personal digital assistant (PDA), cellular telephone, two-way radio transceiver, or the like, which often connect and interact with one other via both wired and wireless interfaces. As users continue to use more of these portable battery-powered devices, battery power management methods that respond to the needs of the overall "system" of devices become more important. In the past, the power for all of these devices has been managed individually, which can be burdensome on the user to keep these devices all sufficiently charged and operational.

Most existing portable battery-powered devices use their rechargeable batteries in one of two modes: either a charging mode while the device is not in use or discharging mode where the battery is discharged while the device is being used. When a user has multiple devices that each have their own battery and power management systems, the user runs the risk of discharging the battery of one device at a faster rate than the other devices. For example, if a person has both a cell phone and PDA, it is possible to completely drain the battery thus rendering the cell phone unusable, while the PDA still has a full charge. In systems where the devices can be physically connected to one another either during use or periods of inactivity, it would be advantageous to have a system that is capable of managing the collective power of each device in the system.

In addition, the prior art includes power management systems capable of sharing power between multiple connected devices. However, such systems do not operate intelligently for the benefit of the overall "system." For example, many cell phones often come with a universal serial bus (USB) cable for connecting to personal computers. The cell phone may be charged by the computer while connected via the USB cable. While the cell phone is connected to a laptop is an example of two battery-powered devices sharing power, this scenario is not a method of managing the power of an entire system. This is simply a one-way power charging method (from laptop to cell phone) and does not take into consideration the use of a device having a greater percentage of charge remaining. The example is a simplistic system that automatically charges the phone while it is connected, regardless of the available power of the laptop or cell phone.

Thus, the need exists for a power management system that can utilize the battery charge of multiple individual devices for power management of all electrical devices connected to it.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
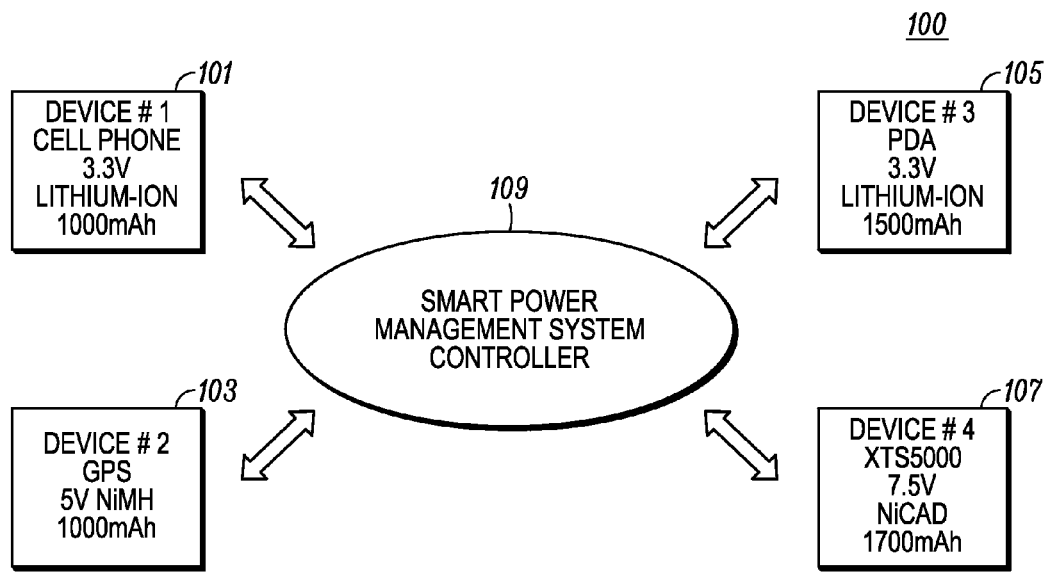
FIG. 1 is block diagram illustrating an example of a smart power management system in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the management of power source life in portable devices. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of managing power source life in portable devices described herein. The non-processor circuits may include, but are not limited to, a radio receiver, a radio transmitter, signal drivers, clock circuits, power source circuits, and user input devices. As such, these functions may be interpreted as steps of a method to perform management of power source life in portable devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 illustrates a block diagram of an overall connection of devices in a smart power management system (SPMS) 100. Those skilled in the art will recognize that the SPMS must be able to distribute power amongst the individual devices as dictated by the needs of the overall system. Those specific needs can vary from user to user and can be changed depending on the algorithm used to control the power flow through the system. As illustrated in FIG. 1, the SPMS 100 includes one or more devices connected to a controller 109. These devices include a cellular telephone 101 having a 3.3-volt lithium ion (LiON) battery, a global positioning system (GPS) receiver 103 having a 5-volt nickel metal hydride (NiMH) battery, a personal digital assistant (PDA) 105 having a 3.3-volt LiON battery and a portable two-way radio transceiver 107 having a 7.5-volt nickel cadmium (NiCad) battery. To effectively control the flow of power between devices, each individual device in the system must be able to measure and record information about the use of the device and the available power left in the battery. This information may include, but is not limited to, time used (Active & Idle), percentage of power remaining, estimated time remaining, battery voltage, average current drain and peak current drain. Moreover, each device will also need a unique identification enabling it to communicate with the controller 109.

Figure 2:
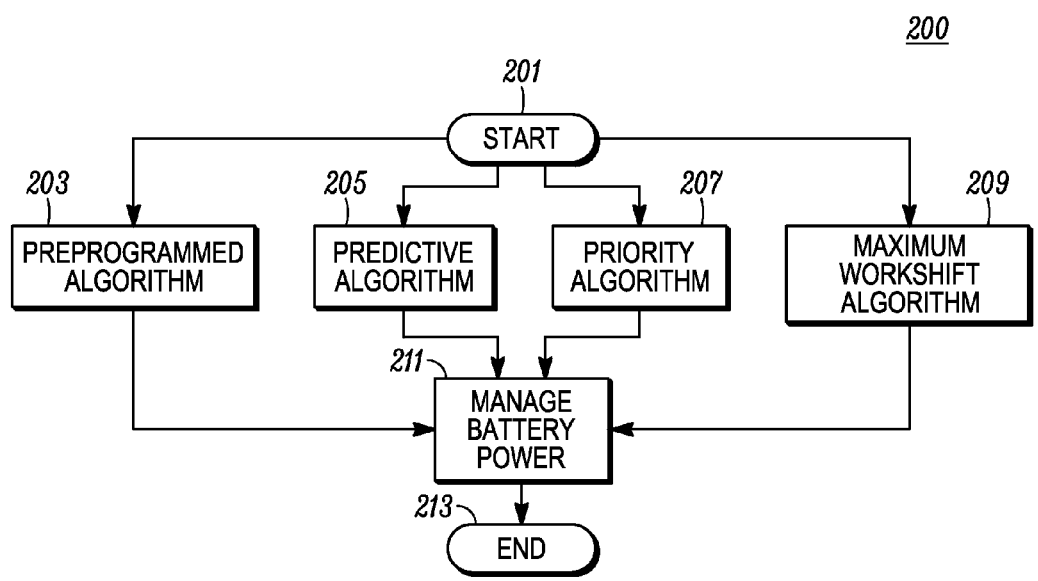
FIG. 2 is a block diagram illustrating selection of various algorithms for use in power management in accordance with the invention.

FIG. 2 is a block diagram 200 illustrating selection of various algorithms for use in power management in accordance with the invention. With reference to both FIGS. 1 and 2, once devices 101-107 are connect to the SPMS controller 109, the user may decide what type of power management scheme is needed based on the user's individual application or conditions. The user starts 201 by selecting a particular management scheme which utilizes its own power management algorithm. These algorithms include a pre-programmed algorithm 205, a predictive algorithm 207, a priority algorithm 209 and a maximum work shift algorithm 211 which are described herein. Each of the devices 101-107 can be programmed with one or more of these algorithms for regulating the flow of power depending on the needs of the system. For example, if one device in the system is deemed to be critical to a given task or mission it may require that the battery maintain a 100% charge at all times. This may be at the expense of the other devices. In order to accomplish this, the system may utilize battery power from the other devices in order to keep the critical device at a full charge. Alternatively, if all devices in the system are equally critical to the operation, the system can maintain a status quo among devices 101-107, ensuring they all discharge uniformly at substantially the same time. Each of these algorithms 203-209 are described in more detail herein.

Figure 3:
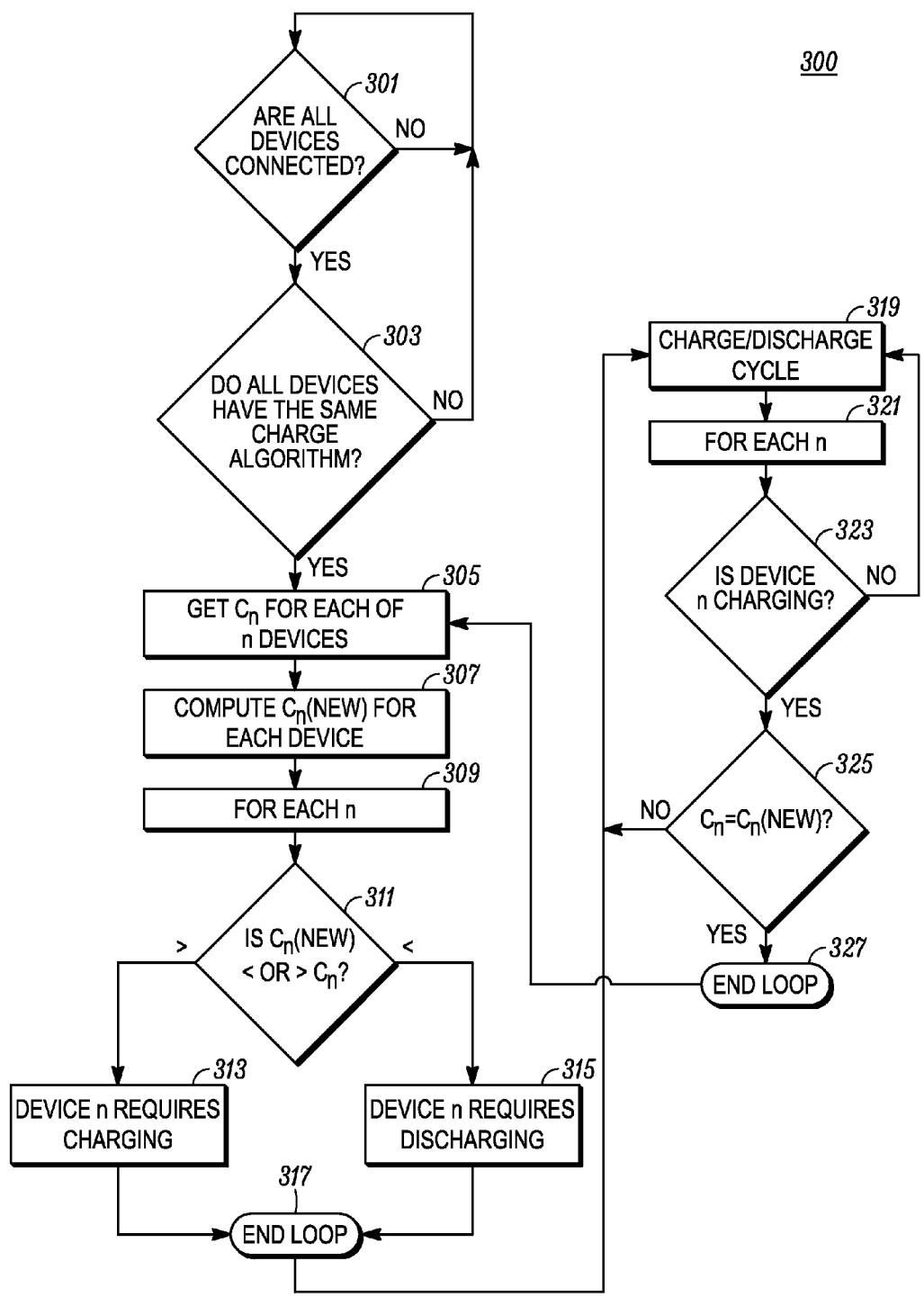
FIG. 3 is a flow chart diagram illustrating the use of a pre-programmed algorithm.

FIG. 3 illustrates a flow chart diagram of a pre-programmed power management algorithm 300 which offers maximum system life. The primary goal of the pre-programmed algorithm is to ensure that all devices 101-107 fully discharge at substantially the same rate. However, instead of relying on measured data this algorithm uses a pre-programmed "expectation" of device usage. Using the example shown in FIG. 1, if the system programmer believes that the cell phone 101 is used 50% of the time, PDA 105 is used 10% of the time, GPS 103 30% of the time, and two-way radio device is used 10% of the time, then the SPMS controller 109 will charge each of the respective batteries according to that pre-programmed percentage. If the devices do not discharge equally at the same time, then the percentages must be adjusted manually for the next full charge/discharge cycle. Thus, the algorithm is based upon a "preprogrammed" usage pattern as defined by the user. Each device (n) is preprogrammed with the anticipated system usage pattern (n % of time used) of each of the devices in the system so that each device is aware of the requirements of the other devices. Connection of all the devices is checked as part of a state machine where the algorithm terminates upon disconnection of one device.

Table 1 below illustrates an example of the status of devices 101-107 when first connected to the SPMS controller 109 and their target power management goal when using power management algorithm 300.

TABLE 1

| Status when first connected | Goal of System |
| --- | --- |
| Cell Phone - 60% charge remaining | Cell Phone - 65% charge remaining |
| PDA - 80% charge remaining | PDA - 65% charge remaining |
| Two-way radio Xcvr - 55% charge remaining | Two-way radio Xcvr - 65% charge remaining |
| GPS - 60% charge remaining | GPS - 65% charge remaining |

As seen in FIG. 3, the process defining the pre-programmed algorithm 300 initially determines if all the devices 101-107 are connected 301. If all the other devices do not have the same charge algorithm 303 then the process begins again to determine if all the devices are connected 301. If all of the devices do have the same charge algorithm then the remaining capacity of each device (n) is determined 305 for each battery of the devices (n). A new remaining capacity is then computed 307 for each device where $C_n(new) = (n\%)(C_T)$ where $C_T$=the sum of all $C_n$ for all devices (n) and n % is the pre-programmed anticipated usage of the device. If $C_n(new)$ exceeds the normal capacity of the device (n), then limit $C_n(new)$ to the battery capacity of the device (n). This allows each device (n) to discharge at substantially the same rate. Thereafter, a mathematical determination is made if the remaining capacity of the device ($C_n(new)$ is less than or greater than the old capacity (Cn) 309, 311. If the remaining capacity ($C_n$ new) is less than the old capacity ($C_n$) then the device requests a predetermined level of charging 313. However, if the remaining capacity ($C_n$ new) is greater than the old algorithm then the device requires discharging 315 and the process ends 317.

The charge/discharge cycle 319 operates by determining 321 for each device (n) if the device is charging 323. If it is not charging, the charge/discharge process cycle beings again 319. However if the device is charging then a calculation is made 325 if the new charge algorithm ($C_n$ new) is equal to the old charge algorithm ($C_n$). If not, the charge/discharge process cycle begins again 319. However, if the both algorithms are essentially the same, then the process ends 327.

Figure 4:
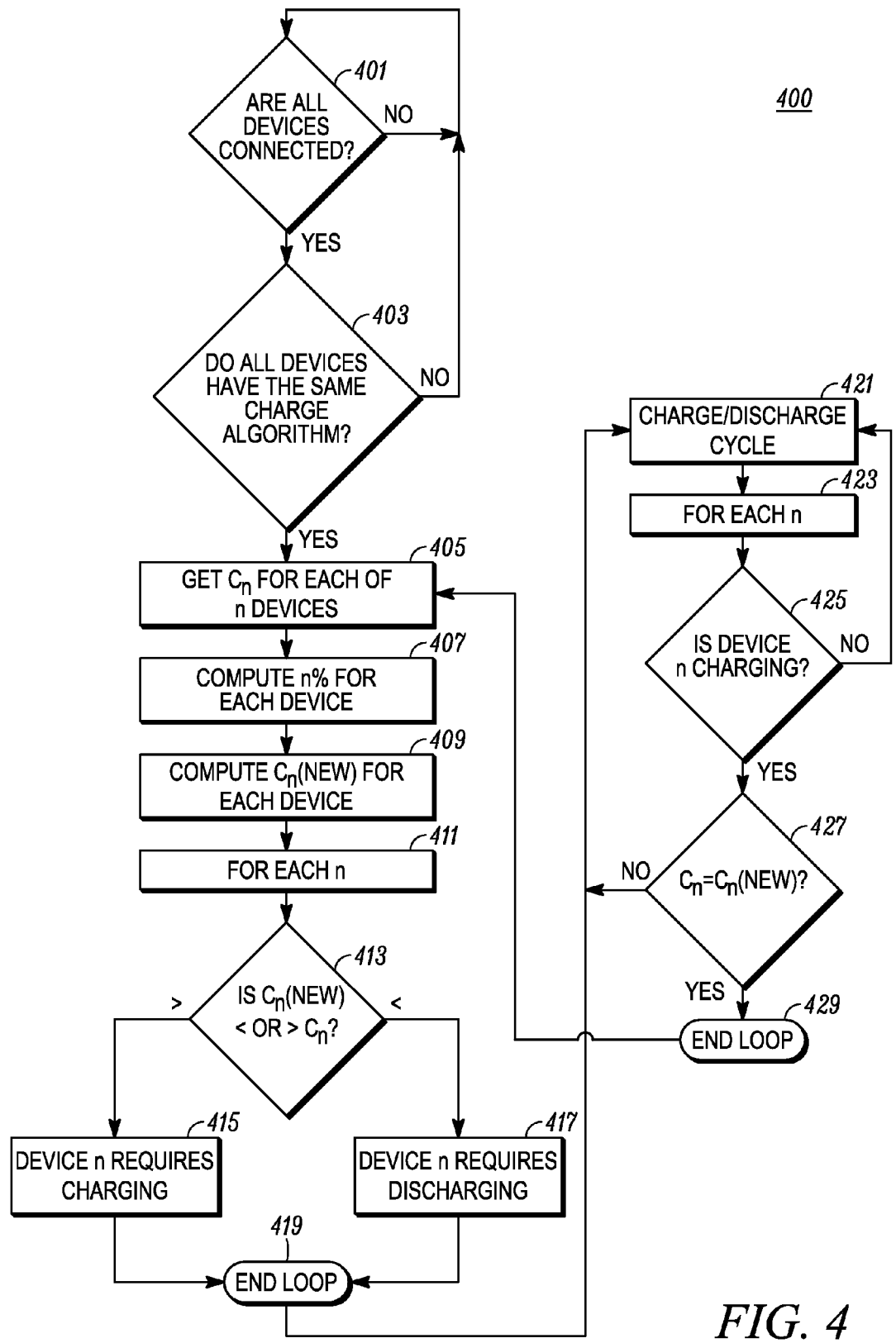
FIG. 4 is a flow chart diagram illustrating the use of a predictive algorithm.

FIG. 4 illustrates the process defining a predictive algorithm 400. The predictive algorithm 400 is used to allow a single device (n) to have maximum system life. This algorithm operates like the Pre-Programmed algorithm 300 to ensure that all devices fully discharge at substantially the same moment in time. However, the predictive algorithm 400 also takes into account the measured historical data recorded from each device. For example, consider a user who has all devices connected 25% of the time. If the user begins using the cellular phone 101 twice as much as any other device, the system will charge the cell phone 101 to a higher percentage than the remainder of the devices in order to compensate for this extra use. Hence, the method utilizing power management algorithm 400 predicts (based on usage) how much power each device needs so that all devices are fully discharged at substantially the same time. Usage is based on a "predictive" usage pattern as determined by actual system use. The percentage of use of each device is determined by the amount of system energy that is used by each device. Connection of all devices is checked as part of a state machine and the algorithm terminates upon disconnection of one device.

Table 2 illustrates an example of the status of devices 101-107 when first connected to the SPMS controller 109 and their target power management goal when using power management algorithm 400.

TABLE 2

| Status when first connected | Goal of System |
| --- | --- |
| Cell Phone - 60% charge remaining | Cell Phone - 85% charge remaining |
| PDA - 80% charge remaining | PDA - 60% charge remaining |
| Two-way radio Xcvr-55% charge remaining | Two-way radio Xcvr-60% charge remaining |
| GPS - 60% charge remaining | GPS - 60% charge remaining |

FIG. 4 is a flow chart diagram of a power management algorithm 400 which includes the step of determining if all the devices are connected 401. If all the devices are not connected, then the process continues until such time as they are connected. After all the devices are connected, a determination is made 403 if the devices have the same charge algorithm. This process includes the step of determining 405 the remaining battery charge capacity $C_n$ for each of the devices n.

This process involves utilizing an the algorithm $n\% = (C_{MAXn} - C_n)/(C_{Tmax} - C_T)$ where $C_T$ is the sum $C_n$ for all devices (n); $C_{Tmax}$ is the maximum system charge when all batteries are fully charged and $C_{MAXn}$ is the maximum capacity of device n battery in milli-amp hours (mAh). For the remaining capacity of each battery charge ($C_n$) a determination is made 413 if the value of ($C_n$ new) is less than or greater than remaining capacity of each battery $C_n$. If $C_n$ new is greater than the $C_n$, the device requires charging 415. However, if $C_n$ new is less $C_n$, the device requires discharging. If the determination is made that the device needs to be charged or discharged, the process ends 419. The charge/discharge cycle 421 includes the steps for each device n of determining 423 if the device is charging 425. If the device is not charging, the charge/discharge cycle begins again 421. However, if the device is charging, a determination is made 427 if the remaining capacity of each device $C_n$ is equal to $C_n$ new 427. If these values are not equal, the charge/discharge cycle begins again 421. However, if they are equal, the process ends 429.

Figure 5:
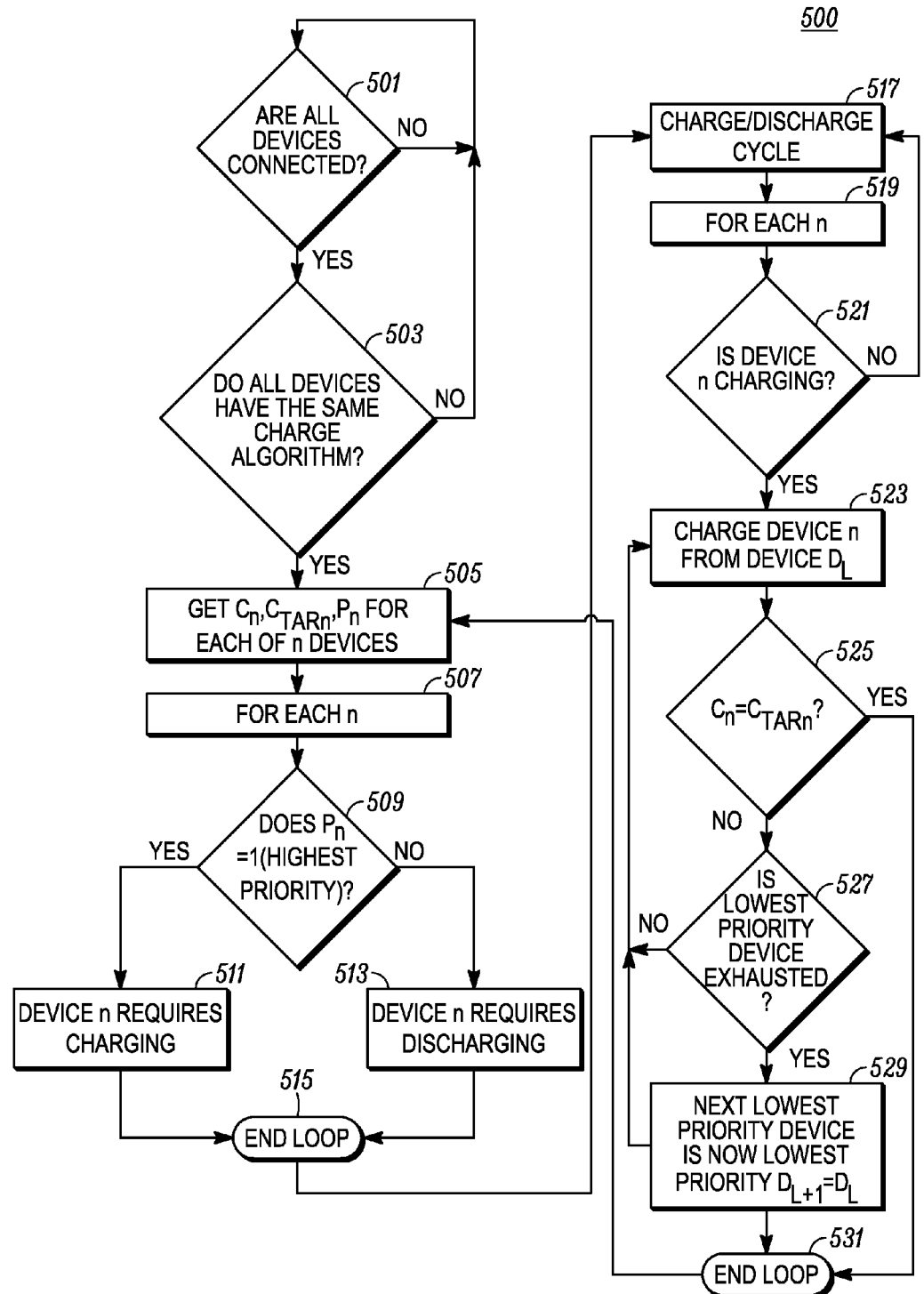
FIG. 5 is a flow chart diagram illustrating the use of a priority algorithm.

FIG. 5 illustrates a flow chart diagram using a priority algorithm 500 for maximizing the life of devices according to priority. The goal of this power management algorithm is to maximize the life of one of the devices in the system. For example, in a public safety environment, a user's two-way radio transceiver is often the most "mission-critical" device used where the life of the two-way radio transceiver must be placed above all others. When the devices 101-107 are connected, power should be directed from any other device to the two-way radio transceiver to ensure maximum life expectancy. The system priority of each of the other devices is pre-assigned. The highest priority device is kept fully charged, while the priority of the remaining devices determines the energy source device during the energy sharing charge cycle. Thus, the flow chart 500 does not illustrate the steps to maximize the life of the system as do the methods as described in FIGS. 3-4. Each device is given a priority of life expectancy. The system then shares energy to keep the highest priority device fully charged with the lower priority devices being allowed to fully discharge if required. Connection of all the devices (n) is checked as part of a state machine where the algorithm terminates upon disconnection of one device.

Table 3 illustrates an example of the status of devices 101-107 when first connected to the SPMS controller 109 and their target power management goal when using power management algorithm 500.

TABLE 3

| Status when first connected | Goal of System |
| --- | --- |
| Cell Phone - 60% charge remaining | Cell Phone - 40% charge remaining |
| PDA - 80% charge remaining | PDA - 40% charge remaining |
| Two-way radio Xcvr - 55% charge remaining | Two-way radio Xcvr-100% charge remaining |
| GPS - 60% charge remaining | GPS - 30% charge remaining |

The priority algorithm 500 includes the steps of determining if all the devices are connected 501. If all the devices are not connected, then the process begins again. However, if the devices are connected, the determination is made 503 if all the devices have the same charge algorithm. This process includes the steps of determining: 1) the remaining capacity $C_n$ for each device, 2) the $C_{TARn}$ which is the target capacity of the battery of each device n (mAh); and 3) the priority $P_n$ defined as the priority of the life expectance of device n for each of the n devices 505. For each device n, a calculation is made 507 if the priority $P_n$ is equal to 1, i.e., the highest priority 509. If $P_n$ is the highest priority 511 then device n requires charging. However, if the device is not the highest priority 513, then it requires discharging. After the charging or discharging determination is made, this ends the process 515.

The charge/discharge cycle 517 includes the steps where for each device n a determination is made 519 if the device is in a charging mode 521. If the device is not in a charging mode, the charge/discharge cycle begins anew 517. If the device n is charging, the charging device is charged from the secondary device $D_L$ 523. This process includes the step of determining if the charging algorithm is equal to $C_{TARn}$ 525 where $C_{TARn}$ is the target capacity of the device n battery. If the charging algorithm is equal to $C_{TARn}$, this ends the process 531. If the charging algorithm is not equal to $C_{TARn}$, then the determination is made 527 if the lowest priority device $D_L$ is exhausted. If it is not exhausted, then the device continues to charge 523 from device $D_L$. If the lowest priority device is exhausted, then the next lowest priority device is escalated in priority 529 such that $D_{L+1} = D_L$. This enables the highest priority device to be charged from the next lowest priority device and the process ends 531.

Figure 6:
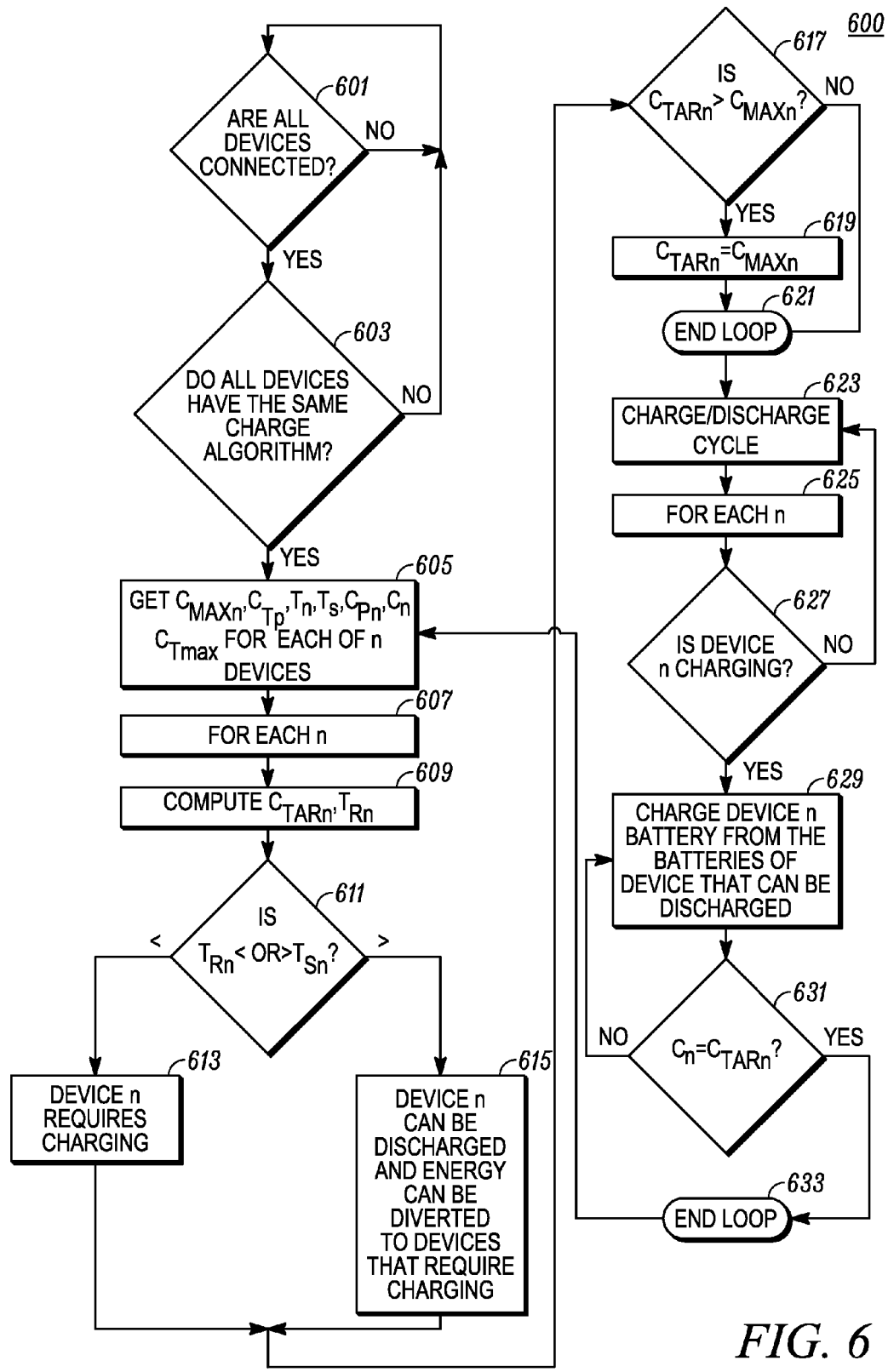
FIG. 6 is a flow chart diagram illustrating the use of a maximum work shift algorithm.

FIG. 6 is a flow chart diagram illustrating a maximum work shift algorithm 600 for maximizing work shift for the devices n. The goal of this power management algorithm is to ensure that the proper devices last for a full work time period or "shift." Thus, if a user has an eight-hour shift and towards the beginning of this shift, the user's two-way radio is heavily operated, then the SPMS will keep the radio fully charged at the expense of other devices. However, as the user approaches the end of the shift, the system control is intuitive to know that the user does not need 100% charge in the radio to last until the shift is completed. If the two-way radio only has 10% charge left, but this is more than sufficient to last until the end of the shift, then power would not be drawn from other devices. Thus, the maximum work shift algorithm does not maximize the life of the system as do the algorithms illustrated in FIGS. 3 and 4. The system shares energy to maximize the life of the pre-programmed work shift time. Connection of all devices is checked as part of a state machine and the algorithm terminates upon disconnection of one device.

The maximum alert shift algorithm 600 includes the step of determining if all the devices are connected 601. If all the devices are not connected then the process begins anew. If all the devices are connected then the determination is made if all devices have the same charge algorithm 603. If all the devices do not have the same charge algorithm then the process begins anew. In order to determine if the devices have the same charge algorithm 603, the $C_{MAXn}$, $C_{Tp}$, $T_n$, $T_s$, $C_{Pn}$, and $C_n$ are all calculated for each device 605 where $C_{MAXn}$ is the maximum capacity of device n's battery; $C_{Tp}$ is the previously sampled sum Cn for all devices n; $T_n$ is the time that device n has been used as a percentage of time since device n was last connected in the system; $T_s$ is a time stamp of the current time remaining in the pre-programmed time of shift, $C_{pn}$ is the previous sample remaining capacity of devices n's battery (mAh); and $C_{Tmax}$ is the maximum system charge when all batteries are fully charged. For device n the $C_{TARn}$ and the $T_{Rn}$ 609 is also calculated 607 where $C_{TARn}$ is the target frequency battery capacity of device n (mAh) in order for device n to be able to operate to the end of the pre-programmed shift time and $T_{Rn}$ is the actual operating time that device n requires to operate to the end of the pre-programmed shift time. These parameters are calculated using the equations: $T_{Rn}=(T_n)(C_{Pn}/(C_{Pn}-C_n))$; and $C_{TARn}=(C_T)(C_{Pn}-C_n)/(C_{Tp}-C_T)$.

A determination is then made if the $T_R$ new is less than or greater than the $T_S$ new 611. If the $T_{Rn}$ is less than the $T_{Sn}$, then the device requires charging 615 where $T_{sn}=(T_s)(T_n)$. However, if the value of $T_{Rn}$ is greater than the $T_{Sn}$, then the device can be discharged and the energy can be diverted to devices that require charging 615. Subsequently, a determination is made 617 if the value of $C_{TARn}$ is greater than the $C_{MAXn}$. If not, this ends the process 621. If this value is greater than $C_{MAXn}$ then a determination is made if the $C_{TARn}$ is equal to $C_{MAXn}$ 619. This also will end the process. The charge/discharge cycle 623 for each device n 625 includes the step of determining if the device is charging 627. If the device is not charging then the process begins anew 623. If the device is charging then the device n is charged from the batteries of devices that can be discharged 629. This includes the steps of determining if the value of the remaining capacity of the battery in device n ($C_n$) is equal to $C_{TARn}$ 631. If not, the device continues to charge 629. If the charging algorithm is equal to $C_{TARn}$, this ends the process 633. Those skilled in the art will recognize that the order in which the discharging devices are allocated for their energy distribution is not detailed here. The maximize work shift algorithm 600 leaves to anyone skilled in the art to determine a suitable algorithm to perform selection of device n for discharge.

Thus, the present invention is a smart power management system (SPMS) that is able to utilize the battery charge of multiple individual electronic devices in a connected system to control the battery life of electronic devices connected to the system. The charge of individual devices can be pre-selected by using algorithms based on the type of use for the devices. When a charger is connected to the system, it is treated the same as any other device with one unique difference; the reported available power remaining is always 100%. This forces the system to draw battery power from the charger to all other devices in the SPMS. The order in which the individual devices are charged depends on the selected algorithm.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A power management system comprising:
a plurality of individually powered electronic devices connected with a power management controller; and
wherein the power management controller operates to determine the operation and charge of each power source of the electronic devices for controlling power source life of at least one device.

2. A power management system as in claim 1, wherein the plurality of individually powered electronic devices are physically connected to the power management controller.

3. A power management system as in claim 1, wherein the power management controller utilizes at least one power management algorithm for controlling operation of the plurality of devices.

4. A power management system as in claim 3, wherein the at least one power management algorithm provides for allowing the plurality of electronic devices to fully discharge at the same moment based upon preprogrammed information.

5. A power management system as in claim 3, wherein the at least one power management algorithm provides for allowing the power sources in the plurality of electronic devices to fully discharge at the same moment based upon predicted historical information.

6. A power management system as in claim 3, wherein the at least one power management algorithm provides for allowing one of the plurality of devices to maximize its power source life.

7. A power management system as in claim 3, wherein the at least one power management algorithm provides for allowing at least one of the plurality of devices to maximize its power source life over a predetermined time period.

8. A system for managing the power source life between a plurality of electronic devices comprising:
a power management controller for use with the plurality of electronic devices;
a plurality of power sources each individually powering each one of the plurality of electronic devices; and
wherein the flow of power from the plurality of power sources is regulated based upon the specific use of the electronic devices as well as their desired life expectancy.

9. A system for managing the power source life between a plurality of electronic devices as in claim 8, wherein the plurality of electronic devices are wired to the power management controller.

10. A system for managing the power source life between a plurality of electronic devices as in claim 8, wherein the power sources are regulated based upon a pre-selected algorithm.

11. A system for managing the power source life between a plurality of electronic devices as in claim 10, wherein the pre-selected algorithm utilizes a preprogrammed expectation of electronic device usage to provide that all the electronic devices discharge at substantially the same moment.

12. A system for managing the power source life between a plurality of electronic devices as in claim 10, wherein the pre-selected algorithm utilizes measured historical data record from each electronic device to provide that all the electronic devices discharge at substantially the same moment.

13. A system for managing the power source life between a plurality of electronic devices as in claim 10, wherein the pre-selected algorithm selects a single electronic device of the plurality of electronic devices to maximize its life.

14. A system for managing the power source life between a plurality of electronic devices as in claim 10, wherein the pre-selected algorithm selects at least one of the plurality of electronic device to ensure that its power source is maintained over a predetermined period of time.

15. A method for managing power source life between a plurality of electronic devices comprising the steps of:
   connecting the plurality of electronic devices directly to a power management controller;
   determining power source information from power sources connected to each of the plurality of electronic devices by the power management controller; and
   managing the charge and drain of each of the power sources based upon the specific use of the electronic devices and a desired life expectancy.

16. A method for managing power source life between a plurality of electronic devices as in claim 15, further comprising the step of:
   regulating the charge and drain of each of the power sources based upon a pre-selected algorithm.

17. A method for managing power source life between a plurality of electronic devices as in claim 16, further comprising the step of:
   utilizing an algorithm based upon a preprogrammed expectation of electronic device usage such that all the electronic devices discharge at substantially the same moment.

18. A method for managing power source life between a plurality of electronic devices as in claim 16, further comprising the step of:
   utilizing an algorithm that operates based upon measured historical data recorded from each electronic device such that the plurality of electronic devices discharge at substantially the same moment.

19. A method for managing power source life between a plurality of electronic devices as in claim 16, further comprising the step of:
   utilizing an algorithm which selects one electronic devices of the plurality of electronic devices for maximizing the life of the one electronic device.

20. A method for managing power source life between a plurality of electronic devices as in claim 16, further comprising the step of:
   utilizing an algorithm which selects at least one of the plurality of electronic devices for ensuring that its power source is maintained over a predetermined time period.

* * * * *